Patented Jan. 23, 1940

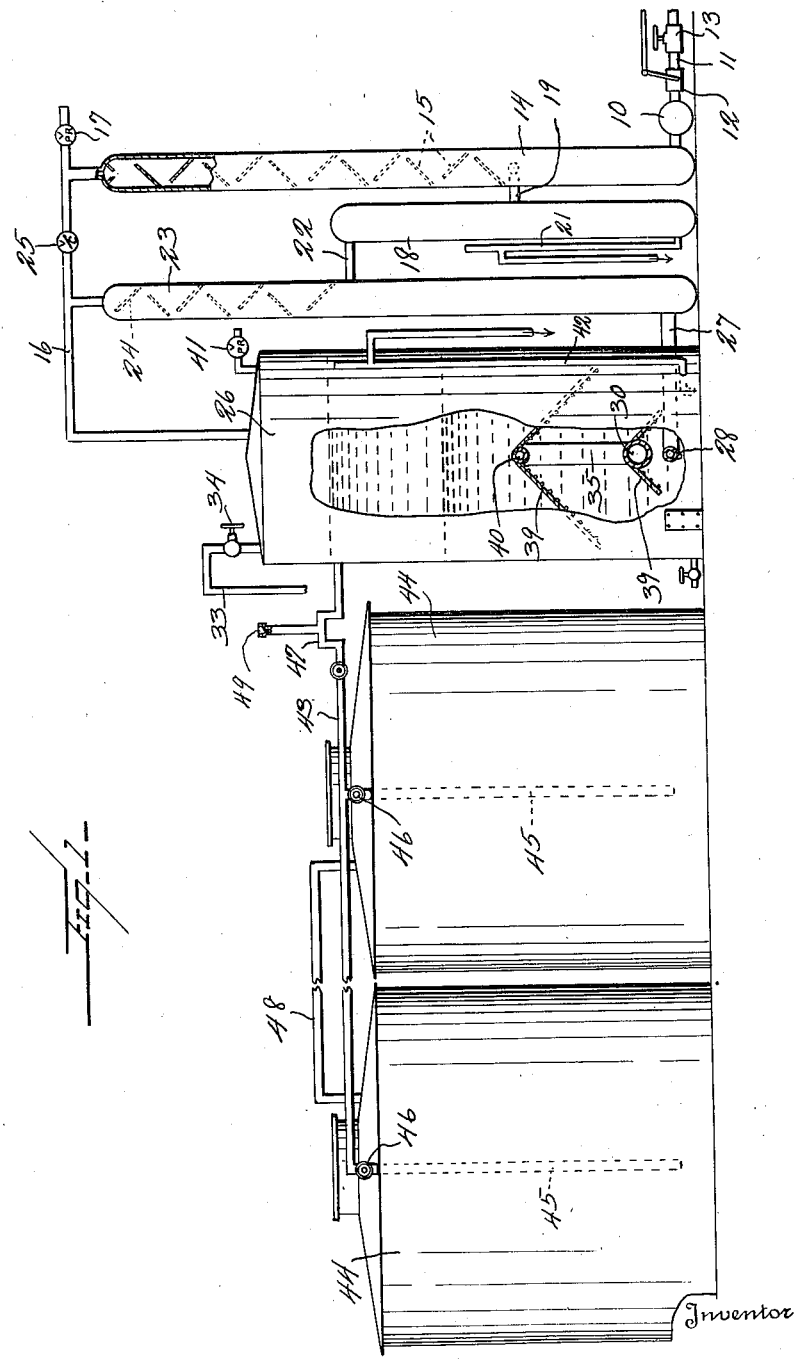

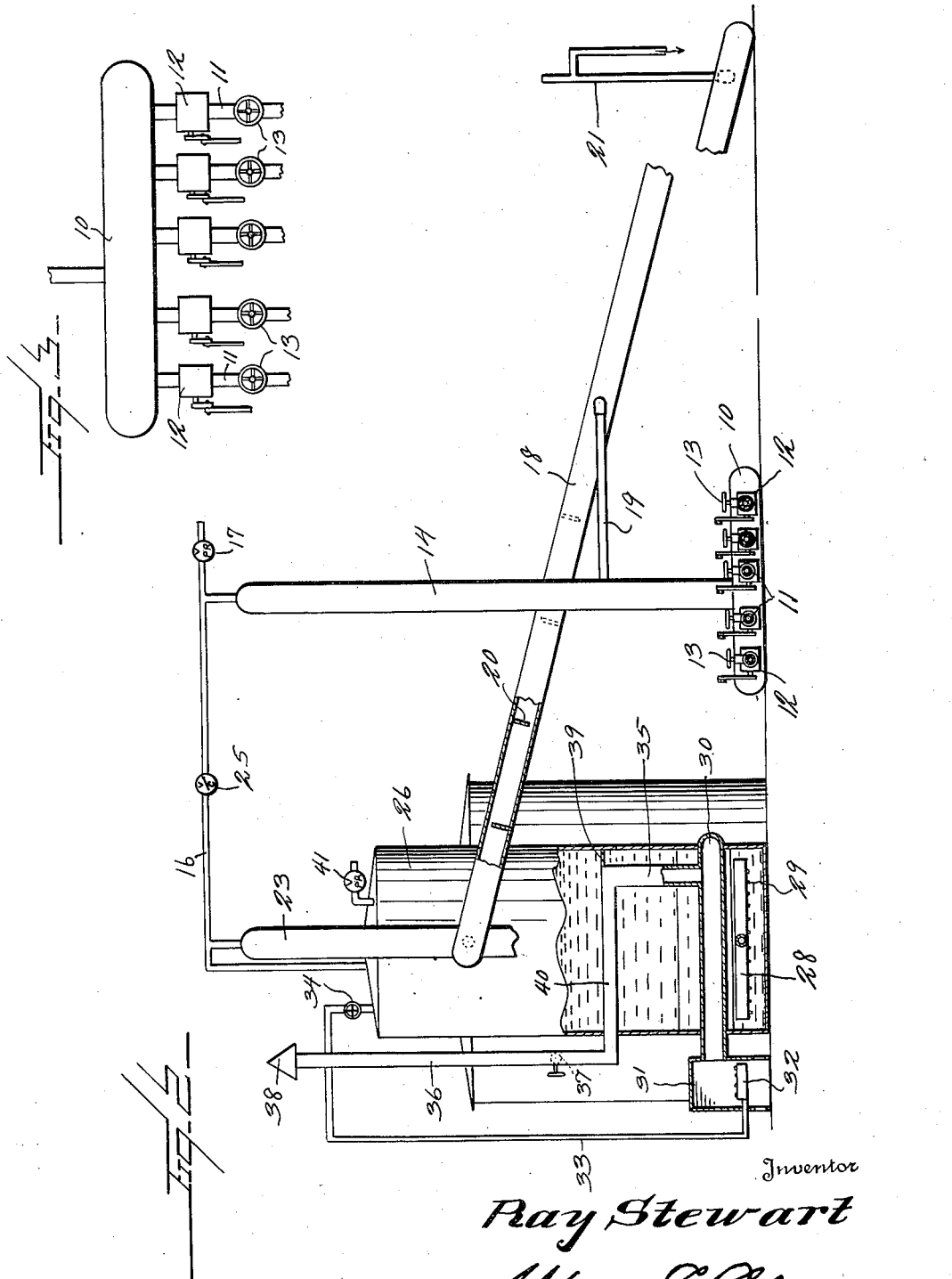

2,188,018

UNITED STATES PATENT OFFICE 2,188,018

DEHYDRATION SYSTEM FOR OIL WELLS

Ray Stewart, Duncan, Okla., assignor to Duncan Tank & Welding Co., Duncan, Okla., a copartnership composed of said Ray Stewart and Gene Clelland Application February 24, 1938, Serial No. 192,384

4 Claims. (Cl. 183—2.7)

This invention relates to the separation of emulsions of oil, water and gas and particularly to the dehydration of oil in stripper fields where salt water is prevalent and where gas pressure is either very low or entirely absent.

The general object of the invention is to provide a system of this character wherein the emulsion is passed through a series of separating chambers wherein the fluids are separated in accordance with their specific gravities and wherein the upflowing gas is scrubbed by contact with baffles to cause the more complete separation of the gas from the oil, the oil, with what salt water remains therein, being then heat treated to still further separate the water from the oil, the water being siphoned off to a receiving pit and the oil and gas being carried to stock tanks.

Other and more detailed objects will appear more fully hereinafter.

The invention is illustrated in the accompanying drawings wherein:

Fig. 1 is a side elevation of a series of separators connected to the stock tanks, the final separating chamber being broken away.

Fig. 2 is an end elevation of the structure shown in Fig. 1, the final separating tank being broken away to show the heater construction.

Fig. 3 is a fragmentary top plan view of the header and pipes leading from the several oil wells into the header.

Referring to the drawings, 10 in Figs. 1 and 3 designates a manifold or header into which the oil from one or more wells is carried by the pipes 11, these pipes being provided with an oil lubricator of ordinary and well known construction, which requires no detailed description, there being one of these lubricators 12 for each of the pipe lines 11 and these lubricators being operated by power from the rod line of the well. Each stroke of the rod line injects a drop of treating compound into the oil lines 11, and the treated oil then passes into the manifold 10. This manifold serves a two-fold purpose in that it is used as a mixing chamber for the thorough mixing of the treating compound with the emulsion coming from the wells and, secondly, it being on the ground at the lowest level, samples of the oil from each well may be taken without the necessity of climbing to the top of a tank. Valves 13 are provided in the several pipe lines 11.

The emulsion from the chamber 10 is carried into the base of a vertical separating chamber 14. This is made of large diametered pipe and is provided with a series of zig-zag baffles 15. The upper end of this chamber 14 is connected to a gas line 16 which has two branches, one of these branches being provided with the pressure relief or pop-off valve 17.

Extending upward at a certain inclination is a second separating chamber 18 and the chamber 14 is connected at about one-third of its height and just below the baffles 15 with the chamber 18 by a pipe 19. This chamber 18 is also in the form of a pipe having approximately the same diameter as the pipe from which the chamber 14 is formed and is provided with a plurality of baffles 20. At its lower end, this chamber 18 is provided with a siphon 21 discharging into a pit and at its upper end the chamber 18 is connected by a pipe 22 with the middle portion of a vertical chamber 23, this chamber also being composed of large diametered pipe and having baffles 24 in its upper portion. The upper end of this chamber 23 is connected to the gas pipe 16 and between the chamber 14 and the chamber 23 in this gas line 16, there is disposed the check valve 25. This pipe 16 leads to the top of a separating tank 26. The lower end of the separating chamber 23 is connected by a pipe 27 to a spreader 28 having downwardly extending nozzles or downwardly opening perforations 29, as shown in Fig. 2.

Just above the spreader 28 is a heater 30 formed by a heating chamber which extends transversely through the lower portion of the tank 26 and which communicates at one end with a fire box 31 wherein is disposed a burner 32. This burner or heater 32 may be either arranged to burn distillate or oil or, as illustrated, may be connected by a pipe 33 to the top of the tank 26, so that the gas in the top of the tank may be utilized for this burner. The pipe 33 is, of course, provided with a valve 34. The heating chamber 30 has a flue 35 extending upward from it and extending through the lower portion of the tank 26, then extending laterally out of the tank and then extending upward in the form of a stack 36 provided with a damper 37 and the hood 38.

Disposed to extend over the heating chamber 30 and the horizontal portion of this flue 35 are V-shaped baffles 39. These baffles have wire netting 40 disposed on their underfaces and serve to retard the upward flow of the oil or emulsion so that the emulsion may become thoroughly heated and these baffles also act to scrub the water and oil apart. As a consequence, the lower portion of the tank 26 becomes filled with salt water while the oil rises into the upper portion of the tank and the gas rises into the top of the tank. The upper end of the tank may be provided with a pressure relief valve 41. Connected to the lower end of the tank 26 is a siphon 42 whereby the salt water collecting in the lower portion of the tank 26 may be carried away to a pit. Extending from the upper portion of the tank is a pipe 43 whereby the oil in the upper portion of the tank is carried off to the stock tanks 44, two of which are shown, though it is to be understood that any number of stock tanks might be connected up in series. The pipe 43 is connected to the interior of each stock tank by means of the vertical pipe 45 which extends down nearly to the bottom of the corresponding stock tank, each of the vertical pipes 45 being provided with a valve 46. This pipe 43 adjacent the tank 26 is provided with the gooseneck 47 to permit the oil in the tank to rise to its level, that is, to permit the oil in the tank to rise above the level of the end of pipe 43 where it enters the tank 26 so that the oil will hold the gas pressure in the upper end of the tank 26 for lease purposes. By the provision of this gooseneck 47, the gas is prevented from passing along the line 43 but is retained within the upper portion of the tank 26. The tanks 44 are connected at their upper ends by means of pipes 48.

It is to be particularly understood that all chambers and tanks are to be insulated with asbestos or other heat insulating lagging approximately 3" thick. This has not been illustrated because it is common practice to insulate tanks and chambers of this character and forms no part of this invention.

It will be seen that the oil after being mixed with the treating material in the chamber 10 is carried into the vertical chamber 14 and that the gas rising upward in this chamber is scrubbed by the baffles 15 so that the gas is partially separated from the oil and water. From the chamber 14 the liquid in the lower portion of the chamber passes into the inclined chamber 18.

The chamber 10 can be used as a mixer if a chemical is used and also provides means for keeping a check on each separate well. In the chamber 14 the gas and the liquid separate and the liquid passes into the chamber 18 in a comparatively quiet manner and gives sufficient time for the free water to separate and drain off.

The specific purpose of the chamber 18 is to separate the free water from the liquid. While, because of the exigencies of space in the accompanying drawings, the chamber 18 has been shown at a relatively slight angle, in actual use the chamber 18 will have an angle of approximately 45°. The liquid as it gradually rises in the chamber 18 is checked by the baffles 20 and this allows the free water to fall back and be drained off by the siphon 21. In this chamber 18 practically all of the free water is separated, the liquid remaining in the chamber 18 being in the form of an emulsion of oil, gas and water. The emulsion passes from chamber 18 into chamber 23 and in this chamber practically all of the gas in the emulsion is removed though there may be still a very small amount of gas in the emulsion as it passes into tank 26. The tank 26 must be large enough to handle the amount of liquid produced by the well or wells, so that the liquid will not pass too quickly through the tank 26 before it is properly heated and treated. The salt water which collects in the lower portion of tank 26 is kept at a temperature high enough to give the desired degree of heat necessary to break up the emulsion. This degree of heat is determined by trial and depends upon the character of the oil being treated, some oils requiring a high degree of heat, almost boiling heat, while others require only a gentle heat. The oil itself is not heated directly but is heated as it rises through the salt water which is kept at a constant level by the siphon 42. The main separation of the water, oil and gas in the emulsion takes place in this tank 26, most of the gas and the free water having been taken care of before the liquid enters tank 26. The gooseneck 47 serves as a seal and allows the oil to rise above the opening of pipe 43, and this allows the oil to pass into the stock tanks 44 without the passage of gas. By providing the gooseneck 47 with the pipe 49, which is open at its upper end, a vacuum is prevented from forming. The pressure in the tank 26 is determined by the pressure relief valve 41 which, of course, can be set to any desired pressure.

The pipes 45 bring the oil into the stock tanks adjacent the bottom of the stock tanks. This warm oil as it rises to the top keeps the oil in the stock tanks warm and allows whatever impurities may still be in the oil to settle out to the bottom.

In all oil treating systems known to me, either a chemical must be used to break up the emulsion, which is quite expensive, or heat and a chemical must be used. The present system does away to a large extent with the use of chemicals. The length of travel of the oil before it goes into the stock tanks is also an important factor in the treatment of the emulsion and this length of travel my system provides. The chamber 18 separates the free water from the oil at the beginning of the treatment and this is a particularly novel feature. The gas which is separated from the oil in chamber 23 is made available for lease and is not lost. I have provided a very compact and efficient system of dehydration, which system is in actual use and is operating in a very efficient manner. The equalizing pipe may or may not be used but by leaving gas in the tanks 44, the gravity of the oil is kept at its highest point.

As stated in the beginning of this specification, this treating system is particularly designed for stripper production where there is generally a great amount of water with a small amount of gas. This apparatus is particularly designed to take care of this large volume of water and to save and store the small amount of gas which is separated therefrom and from the oil.

While I have illustrated certain details of construction and arrangement of parts, I wish it distinctly understood that these might be modified in many ways without departing from the principle of the invention as defined in the appended claims.

What is claimed is:

1. A dehydration system for petroleum emulsions, including in combination a vertically elongated chamber provided with baffles in its upper portion and into the lower end of which the emulsion flows, an upwardly inclined elongated chamber into the lower part of which the emulsion flows from the first-named chamber, the inclined chamber having means for carrying off water from its lower end and having baffles in its upper portion; a second vertically elongated chamber having baffles in its upper portion and with which the upper end of the inclined chamber communicates; a separating tank with the lower end of which the lower end of the said second chamber communicates; means for heating the emulsion within the tank; baffles disposed above the heating means; means for siphoning off the water collected in the lower portion of the tank; means for carrying off the oil collected in the tank above the water; and a gas pipe connection between the upper ends of the vertical chambers and the top of the tank.

2. A dehydration system for petroleum emulsions, including in combination a vertically elongated chamber provided with baffles in its upper portion, means for discharging oil into the lower portion of the vertical chamber beneath the baffles; an upwardly inclined elongated chamber into the lower part of which the emulsion flows from the first-named chamber, the inclined chamber having means at its lower end for carrying off water and having baffles in its upper portion above the connection of the first chamber therewith; a second vertically elongated chamber having baffles in its upper portion, the upper end of the inclined chamber communicating with the said second chamber below the baffles; a separating tank with the lower end of which the lower end of the second mentioned vertically elongated chamber communicates; a heating chamber extending into the tank and having a flue extending upward and laterally through the tank; baffles disposed above the heating chamber and above the flue; means for siphoning off the water collected in the lower portion of the tank; means for carrying off the oil collected in the tank above the water; means for carrying off the gas collected in the upper portion of the tank; a gas pipe connection between the upper ends of the vertically elongated chambers and the top of the tank and means for maintaining a predetermined pressure of gas in the upper end of the tank.

3. A dehydration system for petroleum emulsions, including in combination a chemical mixing manifold having means for admitting thereto the oil from a plurality of wells, an elongated vertical chamber into the lower end of which the manifold discharges and having a gas outlet at its upper end, an upwardly inclined separating chamber, means for conducting liquid from the lower portion of the first-named chamber into the lower part of said inclined chamber, the inclined chamber acting as a separator to separate free water from the oil, an elongated vertical chamber having the upper end of the inclined chamber opening thereinto substantially midway of its ends and having a gas outlet at its upper end and a liquid outlet at its lower end, a relatively large separating chamber into which said liquid outlet opens and having heating means in the lower portion of the chamber and having baffles in the lower portion of the chamber whereby to permit the collection of salt water in the lower portion of the chamber above the heating means and a collection of oil in the upper portion of the chamber above the water, a gas pipe leading from the upper portion of the chamber, a stock tank, and means for piping the oil from the upper portion of said last-named chamber into the lower portion of the stock tank.

4. A dehydrating system for petroleum emulsions, including in combination a vertical elongated chamber provided with baffles in its upper portion, means for discharging oil into the lower portion of the chamber below the baffles, an upwardly inclined elongated chamber, means connecting an intermediate portion of the last-named chamber with an intermediate portion of the first-named chamber, the inclined chamber having means at its lower end for carrying off water and having baffles in its upper portion above said connecting means, a second vertically elongated chamber having baffles in its upper portion and with which the upper end of the inclined chamber communicates just below said baffles, a separating tank, a many-apertured spreader in the lower end of and discharging downwardly into the separating tank and communicating with the lower end of the last-named vertical chamber, a heating chamber extending into the lower end of the separating tank and having a flue extending upward through the tank, a plurality of baffles in the separating tank, means for drawing off the water collected in the lower portion of the separating tank, a stock tank, means for carrying off the oil collected in the separating tank above the water and discharging the oil into the lower portion of the stock tank, and means for carrying off the gas collected in the upper portion of the two first-named vertical chambers and the upper end of the separating chamber.

RAY STEWART.